UNITED STATES PATENT OFFICE.

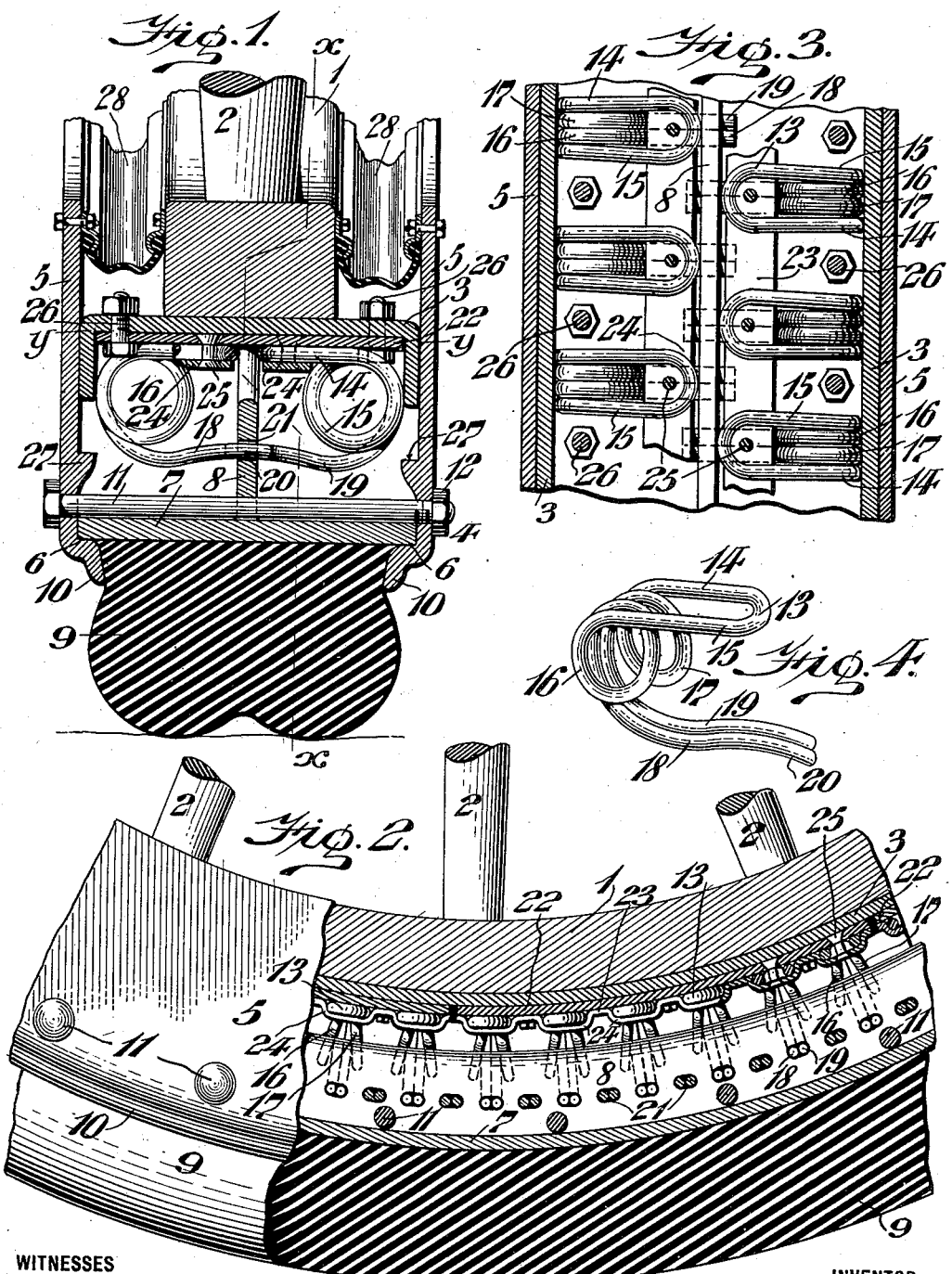

WILLIAM J. CUNNINGHAM, OF PHILADELPHIA, PENNSYLVANIA.

VEHICLE-TIRE.

1,028,331.  Specification of Letters Patent.  Patented June 4, 1912.

Application filed May 23, 1911. Serial No. 628,959.

*To all whom it may concern:*

Be it known that I, WILLIAM J. CUNNINGHAM, a citizen of the United States, residing in the city and county of Philadelphia, State of Pennsylvania, have invented a new and useful Vehicle-Tire, of which the following is a specification.

My invention relates to a new and useful vehicle tire and it consists of a tread member carried by a support, and a plurality of spring members carrying said support and engaged therewith, and said members being suitably carried by the rim of a wheel.

It further consists in providing a web member on the tread support which is provided with a plurality of openings through which the free ends of said spring members pass.

It further consists of novel features of construction all as will be hereinafter fully set forth.

I have found in practice that it is of great advantage to employ a tire which is non-puncturable and which will give the desired resiliency.

The annexed drawings and the following description set forth in detail one mechanical form embodying my invention such construction being but one of various forms in which the principle of the invention may be used.

Figure 1 represents a sectional view of a portion of a vehicle wheel with my novel tire, showing a portion of a spoke. Fig. 2 represents a partial side elevation, partial sectional view on line $x$—$x$ Fig. 1, of a portion of a vehicle wheel with my novel tire. Fig. 3 represents a sectional plan view on line $y$—$y$ Fig. 1. Fig. 4 represents a perspective view of a spring member employed, in detached position.

Similar numerals of reference indicate corresponding parts in the figures.

Referring to the drawings:—1 designates the rim of a vehicle wheel to which is attached a suitable number of spokes 2.

3 designates a channel member secured in any suitable manner to the rim and forming together with it the inner rim 1. Interfitting with the channel member 3 and movable thereon is the tread supporting frame 4, which in the present instance is formed of the annular side members 5, each having the shoulders 6 formed therein which support or upon which rests an annular plate 7 which is here shown as provided with a central web or lug member 8.

The tread member 9, preferably of solid rubber, bears against the plate 7 and is held in position in any suitable manner. In the present instance the side members 5 are provided with the inwardly extending lips 10 between which the tread member 9 is firmly held.

A bolt 11 passing through the side members 5 and web 8 and provided with a nut 12, is adapted to hold the parts of the frame 4 firmly in position so that the same will move as a unit, said side members, plate and tread-member forming the outer rim.

Interposed between the channel member and the tread supporting frame are a plurality of spring members which serve to support said tread frame and which are so formed as to provide a resilient bearing therefor, as well as permitting a proper amount of the lateral movement between the channel and the said frame. As here shown, each spring member is formed preferably of a single piece of suitable spring material formed with a tongue 13, of the material bent upon itself, and providing the limbs 14 and 15, the material forming the same being inwardly coiled to form the convolutions 16 and 17, a suitable portion of which are situated between the limbs 14 and 15 and are brought together and are between portions of the convolutions, with the free ends extending outwardly, as at 18 and 19 to form supporting arms which are suitably depressed or curved, as at 20. As will be noted, there is a plurality of these spring members secured to the channel member 3 upon opposite sides of the central web member or lug 8, with the free ends 18 and 19 extending inwardly or toward each other and passing through suitable openings 21 formed in the web member 8; the walls of which opening are adapted to be seated in said depression 20.

Suitable means for connecting the spring members with the channel 3 are employed, and as here shown, I provide a plate 22 serving as a base plate which is adapted to be secured to the channel member in any suitable or desired manner and upon which I desire to secure a plurality of the spring members. As here shown, I have connected six spring members to a plate, which is accomplished by means of a securing plate 23 provided with the outwardly extending portions 24, which are adapted to extend over and rest upon and so engage the limbs 14 and 15 of the tongue 13 of the springs, and passing between the said limbs 14 and 15 and connecting both the base plate 22 and the securing plate 23, are the bolts or rivets 25, which serve to hold the springs firmly in position with respect to the base plate 22. The latter plate is secured to the channel member 3 by the bolt and nuts 26. It will be noted further, that the said spring members are in staggered order with respect to each other, so that the said annular web member is suitably supported around the entire wall at a desired number of points.

By reason of the convolutions 16 and 17 and the free ends 18 and 19, a suitable amount of resiliency is provided, and at the same time, by reason of the curving inwardly of the convolutions and the space provided between the same and the limbs 14 and 15 a certain amount of lateral spring movement will be permitted between the tread supporting frame and the channel so that it will be seen that the spring members thus serve the double purpose of imparting resiliency to the wheel, preventing creeping of the frame with respect to the channel, and allowing a certain amount of movement between the parts, the effect of which is evident. The free curved ends of the doubled and coiled springs have play in the openings in the web, so that, as the springs are compressed and expanded, said ends will slide in and out in said openings, thereby giving freedom of movement for the springs. The curved shape of the ends of the springs will insure their return to normal position when the pressure upon them is relieved. As the outer portions of the convolutions are between the limbs of the loop or tongue and the inner portions on both sides of the free limbs or ends of the springs, the convolutions may contract and expand freely and have full and unconfined play. The coils or convolutions are compressed under load and expand when relieved, thereby providing a maximum of resiliency and quickness of return to normal shape.

A spring-wheel of great resiliency and sensitiveness as well as of great strength is obtained by the employment of my improved springs. As the springs are arranged in staggered formation, they will be interposed between the inner and outer rim at very short intervals, affording a practically continuous resilient support to the wheel as the latter travels, and increased strength of the spring-support between the rims in proportion to the gage of the spring-wire is attained by the fact that the springs may be placed very closely together.

Upon the side plates or the tread frame, I provide a lug 27 with which the end of the channel member 3 is adapted to contact in order to serve as a stop to limit the inward movement of the said tread frame.

If desired, I may employ a resilient strip 28 of suitable material which is connected with the rim 1 of the vehicle wheel and with the sides of the tread frame, which materials serve as a dust shield or a protector from dirt.

Having thus described my invention, what I claim as new and desire to secure by Letters Patent, is:—

1. In a spring-wheel, an inner and an outer rim, one of said rims having an annular lug-member, and springs between said rims and each spring consisting of a wire doubled upon itself to form a loop secured to one rim, coils, and curved free ends slidably fitted through an opening in the lug-member of the other rim.

2. In a spring wheel, an inner and an outer rim, one of said rims having an annular lug-member, and springs between said rims and each spring consisting of a wire doubled to form a loop secured to one rim, coils having portions extending between the limbs of the loop, and curved free ends extending between portions of the coils and slidably fitted in an opening in the lug-member of the other rim.

WILLIAM J. CUNNINGHAM.

Witnesses:
C. D. McVay,
F. A. Newton.

---

Copies of this patent may be obtained for five cents each, by addressing the "Commissioner of Patents, Washington, D. C."